United States Patent Office 3,632,747
Patented Jan. 4, 1972

3,632,747
BACTERIAL FLY-LARVA-KILLING AGENT
Satohiro Ibuki and Nobuo Fujiyoshi, Saitama-ken, Japan, assignors to Juro Morita, Tokyo, Japan
No Drawing. Continuation-in-part of abandoned application Ser. No. 613,115, Feb. 1, 1967. This application Aug. 20, 1968, Ser. No. 753,874
Int. Cl. A01n 15/00
U.S. Cl. 424—93    7 Claims

ABSTRACT OF THE DISCLOSURE

The present bacterial fly larva-killing agent comprises spores of *Bacillus moritai* ATCC 21282 as an active ingredient and has a positive toxic effect only on fly larvae and is quite non-toxic to humans, cattle, fish and silkworm.

The sufficiently effective spore concentration of the fly larva-killing agent is $10^9$ to $10^{10}$ spores per gram of the agent, and the agent can be used directly or in combination with a filler, emulsifier, or oleaginous liquid.

---

This application is a continuation-in-part of copending application Ser. No. 613,115, filed on Feb. 1, 1967, now abandoned.

This invention relates to a bacterial fly larva-killing agent. More particularly, it relates to a bacterial fly larvae-killing agent showing a definite killing effect on flies and yet is quite nontoxic not only to humans, cattle and fish but also specifically to silkworms.

Chemical insecticides which have been used heretofore as agents for killing insect pests or specifically flies, such as DDT, BHC and DDVP, are all so detrimental to human, cattle and fish populations that there is a likelihood that, if their handling process is not well controlled, a serious danger may arise.

Further, with the development of the resistance of pest insects themselves to chemicals, not only have the effects of the chemicals been reduced, but also the residues of such chemical insecticides detected in crops and products of cattle and poultry have increased year after year until their danger is beginning to be considered serious today.

Recently, procedures have been put forward for killing insects using microbes, which are natural enemies of the insects, and which are innocuous to the human, cattle, fish and silkworm populations, and using insect-chemosterilants. Specifically, microbial insecticides, made mostly of the pathogenes of an infectious disease harmful to insects, are used. A microbial insecticide made mostly of *Bacillus thuringiensis* is already practically sprayed in Europe and America. (For example, see A. Krieg: *Bacillus thuringiensis* Berliner, Berlin, 1961.) However, this *Bacillus thuringiensis* shows a toxicity also on silkworms and therefore cannot be directly used in silkworm growing areas.

The present inventors have endeavored to select bacteria which are non-toxic to humans, cattle, poultry and fish as well as silkworms and yet which show a high and long-lasting toxic effect selectively on flies.

The present inventors succeeded in isolating *Bacillus moritai*, a novel species quite different from the well-known *Bacillus thuringiensis*, from farm soils in Tano-gun, Gunma Prefecture, Japan, and found that *Bacillus moritai* ATCC 21282 can meet the present desired object.

Bacteriological properties of *Bacillus moritai* ATCC 21282 are given below:

Gram positive, Aerobic sporeformer, Motile.
Sporangia definitely swollen.
Acetylmethylcarbinol produced.
Acid from glucose.
No acid from arabinose, xylose, lactose and mannitol.
Salicin negative, Saccharose positive.
Starch not hydrolyzed.
Lecithinase not produced.
Nitrites usually not produced from nitrates.
Urease produced.
Citrates not utilized.
Pathogenic for house fly.
Not toxic to mice, rabbit, chicken, cow, fish, silkworm and canary.

Form

Rods, 0.8 by 2.8 to 3.3 micron.

The spores are ellipsoidal, 1.7 to 1.8 micron, (paracentral).

Comparison of the bacteriological properties of *Bacillus moritai* ATCC 21282 with other microorganisms belonging to the genus Bacillus as described in "Bergey's Manual of Determinative Bacteriology, 7th edition," etc. is shown in Table 1. The present microorganism was found to be a novel species and thus was named "*Bacillus moritai*."

TABLE 1

| Bacillus sp. | I | II | III | IV | V | VI | VII |
|---|---|---|---|---|---|---|---|
| B. megaterium | − | + | − | − | − | + | + |
| B. pumilus | + | − | − | − | − | + | + |
| B. badius | − | − | − | − | − | − | − |
| B. firmus | − | + | + | − | − | | |
| B. lentus | − | + | − | + | − | | + |
| B. macerans | − | + | + | − | − | + | + |
| B. stearothermophilus | − | + | + | − | − | | ± |
| B. circulans | − | + | ± | − | − | | + |
| B. laterosporus | − | − | + | − | − | + | − |
| B. pulvifaciens | − | − | ± | − | − | + | |
| B. brevis | − | − | ± | − | − | + | − |
| B. pathothenticus | − | + | ± | − | − | − | − |
| B. sphaericus | − | − | − | − | ± | − | |
| B. pasteurii | − | − | + | + | | | |
| B. cereus | + | + | + | + | + | − | − |
| B. anthracis | + | + | + | + | − | − | − |
| B. subtilis | + | + | + | − | − | + | + |
| B. coagulans | + | + | − | − | − | ± | ± |
| B. polymyxa | + | + | + | − | − | + | + |
| B. alvei | + | − | + | − | − | + | + |
| B. moritai ATCC 21282 | + | − | − | + | − | − | − |

NOTE.—I=Acetylmethylcarbinol produced; II=Starch hydrolyzed; III=Nitrites produced from nitrates; IV=Urease produced; V=Lecithinase produced; VI=Acid from mannitol; VII=Acid from arabinose and xylose (± shows a variability).

The strain having a pathogenicity on flies among the strains of the Bacillus genus mentioned in Bergey's Manual of Determinative Bacteriology, 7th edition, is found to be the above-mentioned *Bacillus thuringiensis*. However, in comparing *Bacillus moritai* ATCC 21282 used in the present invention and *Bacillus thuringiensis* with each other with respect to bacteriological properties and pathogenic nature, they are found to have distinctive differences between them as in the following Table 2. Hence, it is obvious that *Bacillus moritai* ATCC 21282 can be considered to be a new species.

TABLE 2

| Items | | Bacillus moritai ATCC 21282 | Bacillus cereus | Bacillus thuringiensis |
|---|---|---|---|---|
| Form | Formation of crystalline inclusion bodies. | − | − | + |
| Physiological properties | Gelatin liquefaction | + | ++ | Same as Bacillus cereus. |
| | Starch hydrolysis | − | ++ | |
| | Nitrate reduction | − | ++ | |
| | Salicin utilization | − | ++ | |
| | Saccharose utilization | + | ++ | |
| Pathogenicity | Pathogenicity on silkworms | − | − | ++ |
| | Pathogenicity on flies | ++ | − | + |

The relation between the toxicity and the concentration of spores of the present Bacillus moritai ATCC 21282 is exemplified in Table 3. It is sufficient that the concentration of spores per gram of the larval medium is about $6 \times 10^4$, or more.

TABLE 3

| Concentration of viable spores per gram of larval medium | Number of inoculated larvae | Number of emerged pupae | Number of adults emerged | Percent effectiveness |
|---|---|---|---|---|
| $5 \times 10^6$ | 50 | 0 | 0 | 100 |
| $5 \times 10^5$ | 50 | 0 | 0 | 100 |
| $3 \times 10^5$ | 50 | 14 | 0 | 100 |
| $6 \times 10^4$ | 50 | 22 | 0 | 100 |
| $3 \times 10^4$ | 50 | 35 | 9 | 80 |
| $1 \times 10^4$ | 50 | 41 | 18 | 61 |

The bacterial insecticide according to the present invention shows a selective toxicity on flies but presents no toxicity at all on silkworms. This is also a fundamental difference from the microbial insecticides consisting respectively of Bacillus thuringiensis and Bacillus sotto which are strains of the same genus. Test examples of the toxicity are as shown in the following Table 4.

TABLE 4

| Strain | Silkworm strain and stage | Concentration of spores, ml. | Number of silkworms per test group | Number of deaths |
|---|---|---|---|---|
| Bacillus moritai ATCC 21282. | Larva of the strain J124 × C124 Tested on the 4th instar. | $10^7$ | 5 | 0 |
| Bacillus thuringiensis. | ----do---- | $10^7$ | 5 | 5 |
| Bacillus sotto | ----do---- | $10^5$ | 5 | 5 |

As is evident from the above explanation, the bacterial insecticide for killing fly larvae of the present invention is non-toxic specifically to silkworms but shows a selective killing effect on fly larvae. Therefore, it can be used extensively in silkworm growing countries, with convenience and advantage, and shows an excellent fly-killing effect.

The present bacterial insecticide is effectively applied not to the fly adults, but to the fly larvae.

The mechanism of the action of the bacterial insecticide of the present invention on fly larvae will now be considered. When fly larvae eat the spores, the active ingredient of this insecticide, not only are the fly larvae subjected to the killing action of the present bacterial insecticide, but also the pupae undergo a wing growth control action at the same time, as shown in Table 5.

The transformation phenomena from the larvae to pupae and from the pupae to imagos becomes abnormal, and thus the larvae will generally not become imagos. Even if they become pupae, the pupae will be mal-formed or will not become imagos. Even if they become imagos, the imagos will have incomplete wings. The mal-formed imagos have short lives and usually die in a few days. As a result, a generation of flies can be completely controlled.

TABLE 5

| | Number of produced pupae | Number of adults emerged | Rate of growing wings from pupae in (percent) | Percent effectiveness |
|---|---|---|---|---|
| Control (untreated) | 4,991 | 4,398 | 88.1 | |
| Treated (addition of spores) | 26 | 13 | 50.0 | 99.7 |

When the spores of the present Bacillus moritai ATCC 21282 are sprayed singly or in combination with a carrier or filler over the fly-generating source, the above-mentioned effect can be expected.

When the present insecticide containing $10^9$–$10^{10}$ spores of Bacillus moritai ATCC 21282 per gram is placed on the surface or down to a depth of about 30 cm. from the surface of the fly-generating source (for example, masses of kitchen waste, dung of domestic animals, and composts) in an amount of 25 to 250 g. of the insecticide per m.², the generation of flies can be prevented.

Generally, certain microorganisms belonging to the genus Bacillus produce some exotoxin, and it is said that such exotoxin shows an insecticidal effect. The insecticidal effect of the bacterial insecticide using Bacillus thuringiensis is due to the toxin produced from said bacteria.

The present Bacillus moritai ATCC 21282 also produces some exotoxin, but there is a remarkable difference in the toxicity between the viable spores and the filtrate of the final whole culture of Bacillus moritai ATCC 21282, as shown in Table 6.

For reference, the case of Bacillus thuringiensis is shown in Table 7.

It is obvious from such a remarkable difference that the substance of the insecticidal effect in that case is not exotoxin but is the living bacteria themselves, though the nature of toxic substance has not yet been clarified. This is one of the distinctive differences from the microbial insecticide using Bacillus thuringiensis.

TABLE 6
[(Bacillus moritai)]

| Preparation | Number of viable spores per gram of larval medium | Number of Samples | Number of emerged pupae | Number of adults emerged | Percent effective ness |
|---|---|---|---|---|---|
| Spores | $2.4 \times 10^5$ | 50 | 0 | 0 | 100 |
| | $4.8 \times 10^4$ | 50 | 1 | 0 | 100 |
| Filtrate | 0 | 50 | 28 | 18 | 27 |
| Autoclaved filtrate | 0 | 50 | 43 | 23 | 6 |

TABLE 7

[(*Bacillus thuringiensis*)[1]]

| Preparation | Number of viable spores per gram of larval medium | Percent effectiveness |
|---|---|---|
| Spore-crystal complex | { 1  8.0×10⁸ <br> 2.0×10⁸ } | 47 <br> 0 |
| Filtrate | 0 | 100 |
| Autoclave filtrate | 0 | 100 |

[1] J. Invertebrate Pathol., 7 263-4 (1965).

The present invention provides a bacterial insecticide comprising spores of *Bacillus moritai* ATCC 21282 as an active ingredient.

The spores of *Bacillus moritai* ATCC 21282 are obtained in the following manner: Propagation, culturing and spore formation of the present bacteria are carried out in a culturing medium containing a sufficient carbon source such as molasses, dates, glucose or sucrose, nitrogen source such as corn steep liquor, meat extract, peptone, or urea and growth factors such as biotin or thiamine and being appropriate for spore formation by the ordinary aerated, submerged culturing method.

The culturing is carried out at 20°–35° C., preferably 27° C., and at a starting pH around the neutral, preferably 7–8, for 24–30 hours. The final whole culture is dried by spray or freezing-vacuum after centrifugal separation by means of a Sharples centrifuge or the like, or not, and further dried and properly pulverized to obtain a stability of spore activity, whereby the dried powders of bacteria consisting mainly of spores or final whole culture containing the spores can be obtained.

The thus obtained dry powders of bacteria consisting mainly of spores or final whole culture can be directly used for killing the fly larvae by spraying the same to the places where the larvae live. Further, a filler can be added to the thus obtained dry powders of bacteria consisting mainly of spores or final whole culture. Sufficiently effective spore concentration of the product insecticide is $10^9$ to $10^{10}$ spores per gram.

The filler itself, that is, powders of inactive substance, is well known and is not novel as an ingredient for the present bacterial insecticide. As the powders of inactive substances, such mineral powders as bentonite, kaolin, talc, zeolite, alumina, diatomaceous earth, calcium carbonate, marble powder or lime powder, or volcanic ashes can be added to the dry powders of bacteria consisting mainly of spores or final whole culture. In special cases, vegetable powders of bran or cereals can be used.

In the case of an emulsified insecticide, the ordinary oleaginous liquid such as xylene, kerosene, corn oil or whale oil, and an emulsifying agent such as anionic surface active agents, i.e. salts of higher alcohol sulfate ester and alkylarylsulfonates; cationic surface active agents, i.e. aminoethylimidazolines and quaternary ammonium salts; and non-ionic surface active agents, i.e. polyoxyethylene sorbitan alkyl esters and alkylaryl polyether alcohols, can be used in preparing the emulsified insecticide.

EXAMPLE 1

*Bacillus moritai* ATCC 21282 is inoculated in a bouillon medium containing 1.0% meat extract, 1.0% peptone and 0.2% sodium chloride and having a pH of 7.5, and culturing is conducted at 27° C. for 30 hours. Then, the cultured medium is centrifuged, whereby the spore-formed cells can be obtained in a slurry state. The thus obtained cells are dried and pulverized, whereby the dry powders of bacteria consisting mainly of spores are obtained.

A powdery insecticide is prepared by mixing 0.1 part by weight of dry powders of bacteria consisting mainly of spores and 99.9 parts by weight of bentonite powders (dry basis). The thus prepared powdery insecticide contains $2 \times 10^9$ spores per gram of the product insecticide.

EXAMPLE 2

*Bacillus moritai* ATCC 21282 is inoculated in a medium containing 1.0% molasses, 1.0% corn steep liquor, 0.1% $KH_2PO_4$ and 0.05% $MgSO_4 \cdot 7H_2O$ and having a pH of 7.5, and culturing is conducted at 27° C. for 30 hours. The final whole culture containing spores is spray dried with hot air of 60° C., whereby dry powders of final whole culture are obtained.

A powdery insecticide is prepared by mixing one part by weight of dry powder of final whole culture and 99 parts by weight of kaolin (dry basis). The thus prepared powdery insecticide contains $1.2 \times 10^{10}$ spores per gram of the product insecticide.

EXAMPLE 3

An aqueous emulsified insecticide is prepared by mixing 10 parts by weight of dry powders of bacteria consisting mainly of spores prepared in Example 1, 10 parts by weight of xylene, 0.5 part by weight of an emulsifier (Tween-80, a trademark of a surfactant produced by Atlas Powder Co., USA) and 79.5 parts by weight of water. The thus prepared emulsified insecticide contains $2.0 \times 10^{11}$ spores per 1 ml. and is used after being diluted to 10 to 100 times the original volume with water.

The bacterial fly larva-killing agents prepared in the foregoing Examples 1, 2 and 3 have the killing effects, as shown in Table 8.

TABLE 8

| Example: | Dosage per 100 grams of fly larval medium | Number of inoculated larvae | Number of produced pupae | Number of produced adults | Percent effectiveness |
|---|---|---|---|---|---|
| 1 | 1 gram | 50 | 0 | 0 | 100 |
| 2 | 0.1 gram | 50 | 1 | 0 | 100 |
| 3 | 2 milliliters | 50 | 0 | 0 | 100 |
| Control | 0 | 50 | 49 | 47 | |

NOTE:
(1) Sample flies: *Musca domestica* Linne.
(2) Tests on killing effect only of the corresponding fillers of said examples, which are free of the active ingredient, all show negative results.

The examples exemplified above are merely for illustration of the present invention, and the present invention is not limited thereto.

The essential feature of the present invention is to use the spores of *Bacillus moritai* ATCC 21282 as an effective ingredient for killing fly larvae, singly or in combination with a suitable filler or carrier. Thus, any carrier can be used so long as the carrier will not perish or inactivate the activity of the spores.

Further, it is also possible to simultaneously use a chemical insecticide or an attractant for egg-laying which will not perish or inactivate the activity of the spores.

What we claim is:

1. A bacterial fly larva-killing agent comprising an effective fly larva-killing amount of spores of *Bacillus moritai* ATCC 21282 as an active ingredient and a carrier.

2. A bacterial fly larva-killing agent according to claim 1, wherein said carrier is an inactive substance selected from the group consisting of bentonite, kaolin, talc, zeolite, alumina, diatomaceous earth, calcium carbonate, marble powder, lime powder and volcanic ashes.

3. A bacterial fly larva-killing agent according to claim 1, wherein the carrier is a mineral powder.

4. A bacterial fly larva-killing agent according to claim 1, wherein the carrier is an oleaginous liquid.

5. A bacterial fly larva-killing agent according to claim 1, wherein the carrier is a vegetable powder.

6. A bacterial fly larva-killing agent according to claim 1, wherein $10^9$ to $10^{10}$ spores are contained in a gram of the killing agent.

7. A method for killing fly larvae which comprises applying an effective fly larva-killing amount of spores of *Bacillus moritai* ATCC 21282 to said fly larvae.

References Cited

Chemical Abstracts 66: 94222m (1967).

JEROME D. GOLDBERG, Primary Examiner